United States Patent [19]

Aronne

[11] Patent Number: 5,205,665
[45] Date of Patent: Apr. 27, 1993

[54] FITTING RELEASE UTILIZING BOLT ACTION

[75] Inventor: Armand J. Aronne, Mass, N.Y.

[73] Assignee: Grumman Aerospace Corporation, Bethpage, N.Y.

[21] Appl. No.: 650,599

[22] Filed: Feb. 5, 1991

[51] Int. Cl.⁵ ............................................. B64D 25/08
[52] U.S. Cl. ........................................ 403/15; 403/31;
   403/34; 403/324; 244/122 B; 244/147; 24/602; 24/603
[58] Field of Search ................ 403/15, 31, 324, 2, 403/322, 36, 34; 244/147, 149, 122 B; 24/573, 602, 603

[56] References Cited

U.S. PATENT DOCUMENTS

| | | | |
|---|---|---|---|
| 2,664,610 | 1/1954 | Hannemann | 244/122 B |
| 2,750,644 | 6/1956 | Martin et al. | 244/122 B |
| 3,608,106 | 9/1971 | Coyle | 24/603 |
| 3,624,674 | 11/1971 | Gaylord | 24/603 |
| 3,774,870 | 11/1973 | Sheffield et al. | 244/122 B |
| 3,845,525 | 11/1974 | Gaylord | 24/603 |
| 3,884,436 | 5/1975 | Poehlmann | 24/603 X |
| 4,151,967 | 5/1979 | Lindblad | 244/122 B |
| 4,307,858 | 12/1981 | Naab et al. | 24/602 X |
| 5,029,368 | 7/1991 | Baum et al. | 24/602 |

FOREIGN PATENT DOCUMENTS 23152  5/1956  Fed. Rep. of Germany ...... 403/322

Primary Examiner—Randolph A. Reese
Assistant Examiner—Heather Chun
Attorney, Agent, or Firm—Pollock, VandeSande & Priddy

[57] ABSTRACT

An aviator harness fitting includes a releasable member secured to a buckle member by means of a movable bolt. A pressure inlet is provided to enable translational motion of the bolt in the manner of a piston. When actuated, the bolt moves to a release position to permit separation of the releasable and buckle members.

8 Claims, 2 Drawing Sheets

FITTING RELEASE UTILIZING BOLT ACTION

RELATED APPLICATIONS

This invention relates to the technology of copending U.S. patent applications Ser. No. 07/482,755, filed Feb. 21, 1990 now U.S. Pat. No. 5,036,660; Ser. No. 07/482,886, filed Feb. 21, 1990 now U.S. Pat. No. 5,050,278; Ser. No. 07/534,949, filed Jun. 8, 1990 now U.S. Pat. No. 5,072,457; and Ser. No. 07/567,756, filed Aug. 15, 1990 now U.S. Pat. No. 5,072,897, all by the same inventor and assigned to the same assignee.

FIELD OF THE INVENTION

The present invention relates to releases for fittings, and more particularly to an automatic release for aviator harness fittings.

BACKGROUND OF THE INVENTION

In order for an aviator to release himself from a torso harness installed within an aircraft cockpit, it is necessary to unbuckle or somehow release strap fittings located in the harness. The two primary design objectives for such release fittings are security during flight and quick release when circumstances warrant.

Although a number of models have been employed in the past, it has always been difficult to achieve a high degree of securement with the attendant capability of quick and easy separation.

BRIEF DESCRIPTION OF THE INVENTION

The present invention is directed to an improved fitting release for an aviator's harness but it should be kept in mind that the release mechanism may be employed in more general applications.

The fitting of the present invention basically includes two components having a sliding bolt securing them together. The bolt acts as a piston so that, when compressed air is introduced into the fitting at one bolt end, the bolt is moved to a second position wherein the two components of the fitting become free to disengage. A spring biases the fitting in its normal static position but, upon translation of the bolt to a release position, the spring changes its direction of bias and precludes spring rebound thereby ensuring that the bolt retains its release position until it is manually moved to its static position.

The translational motion of the bolt between a fitting securement position and a release position represents a simple, yet elegant, solution to achieving the aforementioned primary design objectives for a harness fitting.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
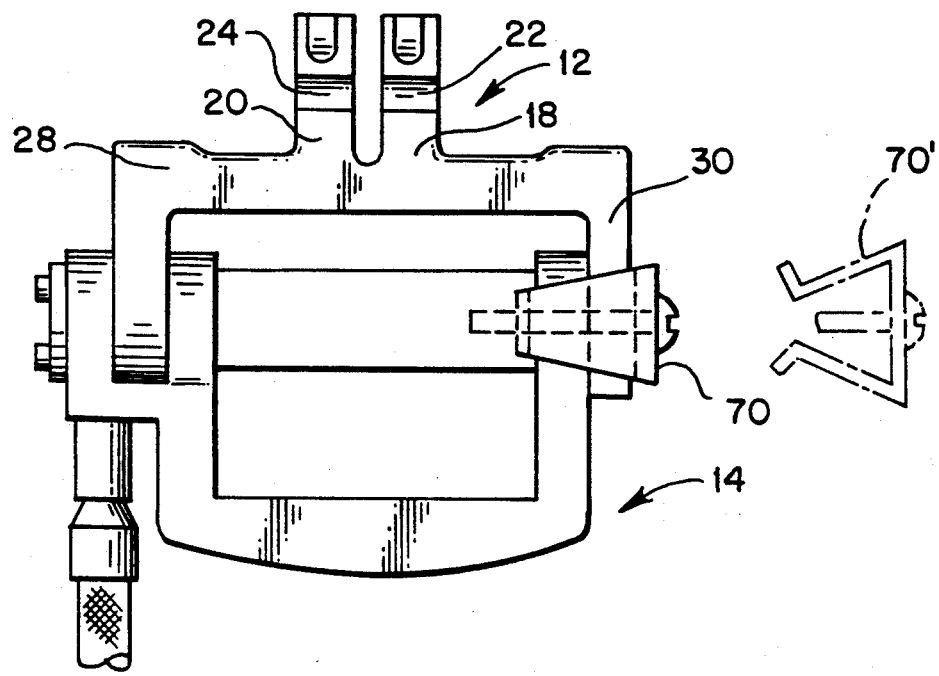
FIG. 1 is a plan view of a releasable harness fitting in accordance with the present invention.

As seen in FIG. 1 the fitting of the present invention is seen to include a releasable member 12 and a pivotally mounted buckle member 14, through which harness straps pass. The releasable member 12 includes two lugs 18 and 20 that are engaged by a mating female connector (not shown) fixed to a section of harness strap. When the releasable member 12 becomes released from the buckle member 14, the harness strap sections connected to these members become separated thereby opening the harness strap. By mounting two such fittings in the torso portion of a harness, release of the fittings will facilitate exit of an aviator from the harness as necessary. The lugs 18 and 20 include grooves 22 and 24 therein which cooperate with detent means formed in the mating female connectors. It should be mentioned that the female connectors are conventional and are therefore not shown.

Figure 2:
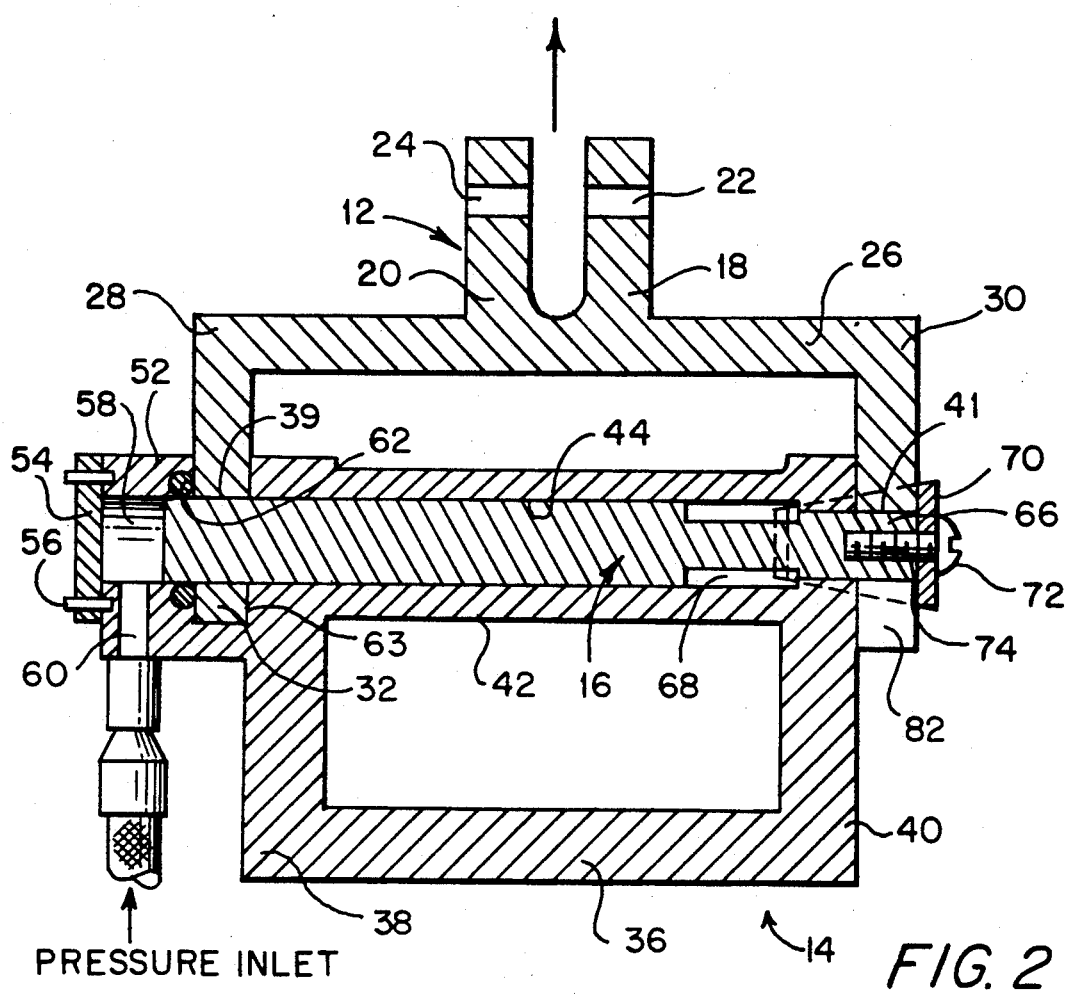
FIG. 2 is a simplified diagrammatic cross-sectional view of the present invention.

Referring to FIG. 2, a bolt 16 is generally indicated in the central portion of the fitting. In the position shown, the bolt effectively latches the releasable member 12 to the buckle member 14 and the latched components are retained by a spring clip 70. The shape of the clip is more clearly shown when rotated 90° as indicated by 70'. As will be presently explained, pressurization of the fitting causes the bolt to act as a piston and be displaced to a release position. In this release position the members 12 and 14 are free to release from one another thereby opening the strap sections (not shown) to which the members are attached.

The structure of the releasable member 12 is seen to include a bight section 26 appending to generally perpendicular legs 28 and 30. The lower end 32 of leg 28 has an opening 39 formed therein to receive the left illustrated end of bolt 16. Similarly, the lower end of leg 30 has an opening 41 formed therethrough to receive bolt 16.

The buckle member 14 is seen to include a bight section 36 articulating to generally perpendicular legs 38 and 40. A central cylindrical leg 42 completes the periphery of buckle member 14 and serves as a bushing for bolt 16 due to the fact that a cylindrical through bore 44 is coaxially formed through the cylindrical leg 42. A projection 52 coaxially extends from the left end of cylindrical leg 42 through which the through bore 44 extends. The left end of through bore 44 is capped with an end cap 54, secured in place by means of suitable fasteners 56. A through bore space 58 exists between the left illustrated end of bolt 16 and the end cap 54. This space communicates with an inlet 60 of compressed air, ballistic, or stored gas. By installing an O-ring 62 around the through bore 44 at the left end of bolt 16, the bolt may serve as a piston, pressurization of the space 58 causing translational motion from left to right which will release the releasable member 12, as will be later explained.

FIGS. 1 and 2 illustrate the fitting in a latched position. The leg 28 of releasable member 12 is received within a seat 63 formed in the projection 52. In this initial latched position, the left end of bolt 16 passes through opening 39 in leg 28 as well as being received within the projection 52 of the buckle member 14. Thus, the left end of bolt 16 maintains securement between the releasable and buckle members. In this original position the right enlarged end 66 of bolt 16 passes through leg 30 of releasable member 12. Therefore, the leg 30 is secured to the buckle member 14. Spring clip 70 retains members 12 and 14 together to prevent uncontrolled sliding displacement of bolt 16.

Figure 3:
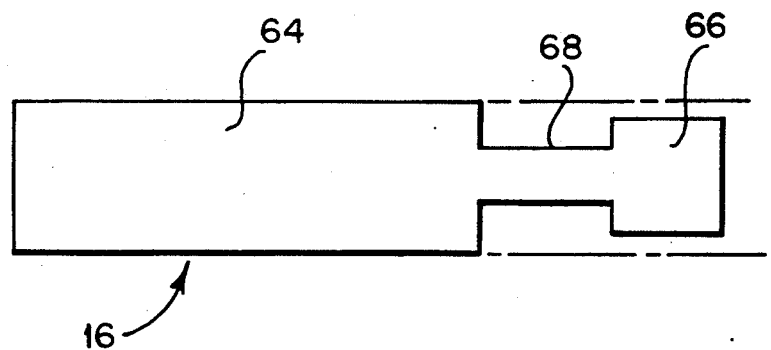
FIG. 3 is an external view of the bolt employed in the present invention.

The bolt 16 is indicated in FIG. 3 as having a left end cylindrical section 64 extending to a step-down median cylindrical section 68 which then extends outwardly to the cylindrical enlarged end 66 that has a smaller diameter than section 64.

Figure 4:
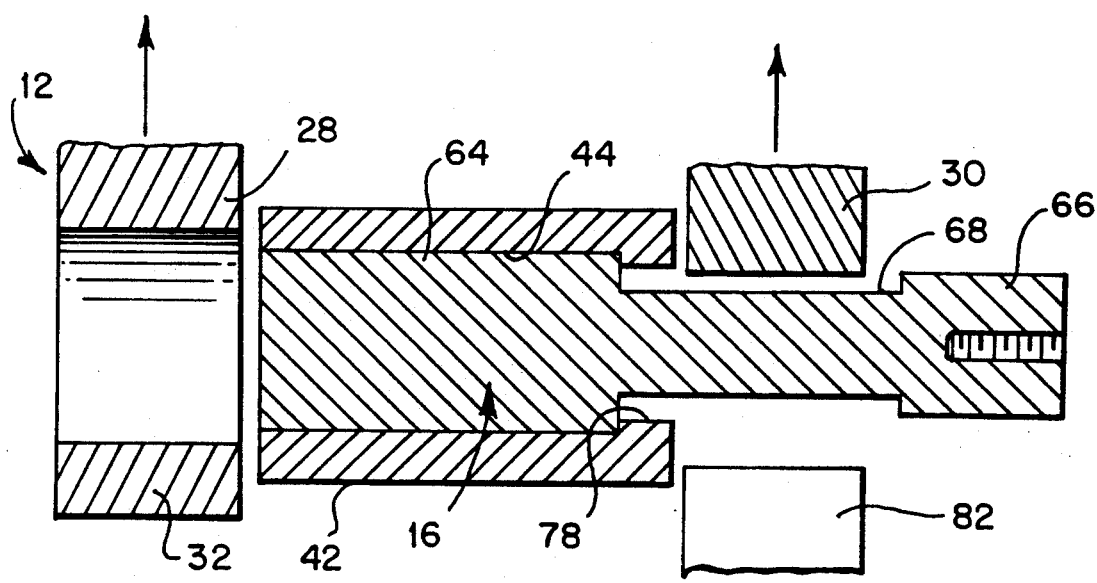
FIG. 4 is a partial sectional view of the present invention particularly indicating the translated release position of the fitting bolt.

In order to appreciate the condition of the mechanism in the release position, after pressure is introduced at inlet 60, reference is now made to FIG. 4. In this latter figure the bolt 16 is seen in a translated position after release of spring clip 70. The left end of bolt 16 is now free from leg 28 of releasable member 12. In actuality, the through bore 44 has a step-down diameter at 78 thereby acting as a mechanical stop for the translated motion of bolt 16. The outer end of releasable member leg 30 has a slotted circular C-shaped end 82 formed therein so that in the translated bolt position of FIG. 4, the right cylindrical section 66 of bolt 16 is free to disengage from the slotted end 82 thereby freeing the releasable member 12 from the buckle member 14. Of course, in the original latched position of FIG. 2, the cylindrical section 66 was in transverse alignment with the slotted end 82 and therefore laterally secured. Since the slot clearance is designed to be less than the diameter of section 66 but more than step-down section 68, disengagement will only occur when the bolt has translated thereby creating sufficient clearance between the step-down section 68 of bolt 16 and the slotted circular end 82 of leg 30 to allow the bolt to disengage from the slotted end.

After release has occurred, the bolt will be maintained in the translated position until it is manually pushed to its original position which will normally be done after the releasable member 12 and buckle member 14 are connected together and spring clip 70 reset. The presence of the spring clip 70 on the translated bolt prevents the bolt from rebounding back into the cylindrical leg 42 and jamming mechanism release.

As thus far described it will be appreciated that the present invention offers a simple and reliable releasable fitting which employs a translatable bolt for latching together two normally connected fitting members.

It should be understood that the invention is not limited to the exact details of construction shown and described herein for obvious modifications will occur to persons skilled in the art.

I claim:

1. A releasable fitting comprising:
   a first member including a central leg having a through bore formed therethrough;
   a bolt coaxially located in the through bore;
   a second member having first and second parallel legs extending from a median section;
   the ends of the legs having openings therein and receiving respective ends of the bolt for normally latching the first and second members together;
   an intermediate length of bolt having a stepped-down diameter;
   means located at one end of the through bore for introducing pressurized fluid against one end of the bolt which actuates translational motion of the bolt;
   a slot radially formed in a circular outward end of the second leg, the slot having a clearance less than the diameter of the bolt end received in a central opening that is formed in the circular outward end of the second leg, the slot having a clearance greater than the stepped-down bolt diameter which permits disengagement of the bolt from the second leg in a translated position of the bolt;
   the translated position of the bolt also freeing the bolt from engagement with the first leg thus unlatching the first member from the second member.

2. The structure set forth in claim 1 wherein the pressure-introducing means comprises:
   an end cap positioned over one end of the through bore, in spaced relation to the bolt, thereby creating a pressurizeable volume; and
   an inlet communicating with the volume for connecting a supply hose.

3. The structure set forth in claim 1 together with a spring clip connected between the central leg and the bolt for normally biasing the bolt in a latching position, but which yields to allow bolt translation after pressurized fluid is introduced.

4. The structure set forth in claim 1 together with a mechanical stop formed in the through bore for limiting the translational motion of the bolt to a position retaining the bolt within the through bore while positioning the bolt correctly for release of the members.

5. A harness release fitting comprising:
   a first buckle member for receiving a first strap section, the member including a central leg having a through bore formed therein;
   a bolt coaxially located in the through bore;
   a second connector member having first and second legs extending from a median section;
   connector means extending from the median section for connection to a mating buckle member retaining a second strap section;
   the ends of the legs of the second member having openings therein and receiving corresponding ends of the bolt for normally latching the first and second members together;
   an intermediate length of the bolt having a stepped-down diameter;
   means located at one end of the through bore for introducing pressurized fluid against one end of the bolt which actuates translational motion of the bolt;
   a slot radially formed in a circular outward end of the second leg of the second member, the slot having a clearance less than the diameter of the bolt end received in a central opening that is formed in the circular outward end of the second leg, the slot having a clearance greater than the stepped-down bolt diameter which permits disengagement of the bolt from the second leg of the second member in a translated position of the bolt;
   the translated position of the bolt also freeing the bolt from engagement with the first leg of the second member thus freeing the first member from the second member.

6. The harness fitting set forth in claim 5 together with an end cap positioned over one end of the through bore, in spaced relation to the bolt, thereby creating a pressurizeable volume; and
   an inlet communicating with the volume for connecting a supply hose.

7. The harness fitting set forth in claim 5 together with a spring clip connected between the central leg and the bolt for normally biasing the bolt in a latching position, but which yields to allow bolt translation after pressurized fluid is introduced.

8. The harness fitting set forth in claim 5 together with a mechanical stop formed in the through bore for limiting the translational motion of the bolt to a position retaining the bolt within the through bore while positioning the bolt correctly for release of the members.

* * * * *